Patented Mar. 11, 1924.

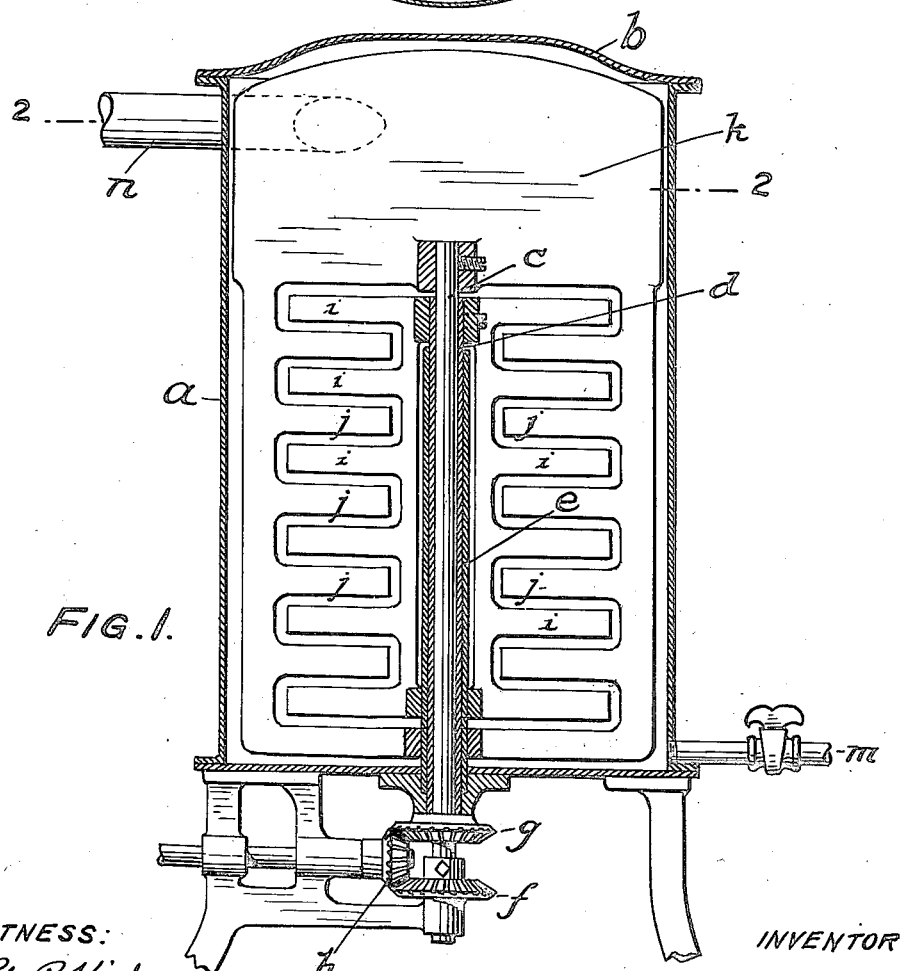

1,486,577

UNITED STATES PATENT OFFICE.

CYRUS HOWARD HAPGOOD, OF NUTLEY, NEW JERSEY, ASSIGNOR TO THE DE LAVAL SEPARATOR COMPANY, OF NEW YORK, N. Y., A CORPORATION OF NEW JERSEY.

PROCESS AND MACHINE FOR WHIPPING CREAM.

Application filed June 6, 1923. Serial No. 643,623.

*To all whom it may concern:*

Be it known that I, CYRUS HOWARD HAPGOOD, a citizen of the United States, residing at Nutley, county of Essex, and State of New Jersey, have invented a new and useful Improvement in Processes and Machines for Whipping Cream, of which the following is a full, clear, and exact description, reference being had to the accompanying drawings, which form a part of this specification.

In an application filed by me June 14, 1923, Serial No. 645,474 I have set forth an apparatus for manufacturing butter oil wherein cream is centrifugally separated from the whole milk, washed with water to eliminate more or less of the casein, cooled, whipped, agitated with water and again separated to eliminate the remaining casein. This process involves a continuous operation, so that a stream of cream is being continuously fed forward to the whipper at a substantially constant rate. The whipper must be adapted to whip this cream without churning it into butter and discharge the cream to the agitator at a rate corresponding to the feed. The object of my invention is to provide a whipper adapted for use in this process or in any other process wherein the rate of flow of cream to the whipper is predetermined, as distinguished from a whipper in which the rate of feed is varied in accordance with the capacity of the whipper.

In an application filed by me November 16, 1922, Serial No. 601,215, I have set forth a cream whipper and process of whipping cream having certain features in common with the invention herein set forth; but in the specific embodiment of the invention therein illustrated, means are provided to regulate the rate of feed to insure the displacement of whipped cream from the whipping zone after it is thoroughly whipped but before it breaks into butter; and the specific construction of the whipper is especially adapted to cooperate with such feed regulating means. In the present case, I have so modified and improved the construction of the whipper as to adapt it to whip cream that is fed to it at a predetermined speed and to whip it thoroughly without carrying the whipping operation to the extent required to cause the cream to break into butter. My invention also comprises a new or modified process of whipping, which involves regulating the degree of whipping in accordance with the fixed or predetermined rate of feed and the positive displacement of the whipped cream from the top of the column of cream that is being whipped.

In the drawings, which show a preferred embodiment of the whipper and are adapted to carry out my process:

Fig. 1 is a vertical section through the whipper.

Fig. 2 is a horizontal cross-section.

A container $a$, provided with a removable top $b$, provides a whipping chamber. Extending through the bottom of the chamber is a revoluble shaft $c$ and a revoluble sleeve $d$. Projecting up from the bottom of the container is a stationary exterior bearing or guiding sleeve $e$. The shaft $c$ and sleeve $d$ have secured to them bevel gears $f$ and $g$, respectively, which are engaged by a common driving pinion $h$ and thereby revolved in opposite directions.

Secured to the sleeve $d$ is a frame comprising whipping blades $i$ extending radially outward from near the axis of the shaft and sleeve toward the peripheral wall of the container. Secured to the shaft $c$ is another frame comprising whipping blades $j$ extending from near said peripheral wall toward said axis and a plate or plates $k$ at the upper part of the container above the blades $i$ and $j$.

The two series of blades $i$ and $j$ are arranged alternately. The plates $k$ extend diametrically substantially across the container and vertically from the uppermost whipping blades to the upper end of the container.

A feed pipe $m$ communicates with the bottom of the container. An outlet $n$ for whipped cream opens in the wall of the container just below its top.

Due to the rotation of the two series of whipping blades in opposite direction, the cream entering the container through the inlet $m$ is subjected to a thorough whipping, the globules of cream being beaten back and forth in opposite circumferential directions as they are displaced upwardly by the constantly inflowing stream of cream.

After the whipped cream has been displaced upwardly out of the whipping zone, it is engaged by plates $k$, which function to some degree as ejectors, as they push the whipped cream around to the discharge opening n and facilitate its escape therethrough. The whipped cream, although materially reduced in density below that of the unwhipped cream, is not in a fluffy or fluid condition, but is in the form of hard lumps that have little or no fluidity. The revolving plates k bring all parts of the whipped cream opposite the orifice n through which it discharges partly by the action of the plate k and partly by reason of the upward and outward pressure of cream that exists throughout the body of the container.

While the whipper, at a given speed of rotation, is perfectly capable of functioning as a butter churn if the inflow of cream be relatively retarded, and is inefficient to thoroughly whip the cream if the inflow of cream be relatively accelerated, I have found that if the rate of inflow of cream be maintained substantially constant, the contrivance will function to insure the complete conversion of the cream into whipped condition without breaking into butter provided the speed of rotation of the opposite moving blades be varied in accordance with the rate of flow. Increasing the speed of rotation of the whipping blades is found to give substantially the same results as increasing the number of blades and the height of the whipping zone, whereas decreasing the speed of rotation of the whipping blades is the substantial equivalent of a reduction in the number of blades and in the height of whipping zone. However, care must be taken to avoid the over-accumulation of cream in the top of the container with consequent back pressure of cream. This is avoided by maintaining the rotation of the cream after it leaves the whipping zone so as to facilitate its discharge through the outlet.

It will be understood that there are operative in the whipper two forces, one tending to throw the cream outward by reason of the centrifugal force created by the rotary blades and the frames k and the other tending to push the cream upward by reason of the pressure of the inflowing cream. As a result of these pressures, it is probable that the column of cream in the container is not solid, but has a more or less hollow core the diameter of which increases toward the top. The operation of these forces insures action upon most or all of the cream in the peripheral zone of the container, where the speed of rotation of the blades and of the ejector plates is relatively high and also insures the proper ejection of the whipped cream.

Having now fully described my invention, what I claim and desire to protect by Letters Patent is:

1. A cream whipper adapted to operate upon a continuously flowing stream of cream, comprising a container having an inlet for cream in its lower part and an outlet for whipped cream in its upper part, a whipping contrivance of substantially less height than the container and whose upper end is below said outlet, and a member in the upper part of the container above the whipping zone adapted to facilitate the discharge of whipped cream through said outlet.

2. A cream whipper adapted to operate upon a continuously flowing stream of cream, comprising a container having an inlet for cream in its lower part and an outlet for whipped cream in its upper part, a whipping contrivance comprising elements rotating about a vertical axis in opposite directions, and a plate above, and rotating about the axis, of the whipping contrivance, adapted to convey the whipped cream displaced upwardly from the whipping zone past said outlet and facilitate its discharge.

3. A cream whipper adapted to operate upon a continuously flowing stream of cream, comprising a container having an outlet for cream in the upper part of its outer wall, a whipping contrivance comprising a vertical shaft, a sleeve on the shaft, a frame secured to said sleeve and comprising a series of radial blades, a frame secured to the shaft and comprising a series of radial blades, the blades of the two frames extending in opposite directions and arranged in alternate relation, and a plate, rotating with one of said frames, extending above said blades and transversely of the container and adapted, when rotated, to pass over said outlet, and means to rotate said shaft and sleeve in opposite directions.

4. A cream whipper adapted to operate upon a continuously flowing stream of cream, comprising a container having an inlet for cream in its lower part and a tangentially disposed outlet for whipped cream in its upper part, a whipping contrivance comprising elements rotating about a vertical axis in opposite directions, and a plate above the whipping contrivance extending from below to above said outlet and rotatable about the axis of the whipping contrivance in the direction adapted to facilitate the discharge through said outlet of the whipped cream displaced upwardly from the whipping zone.

5. The process of whipping cream, which comprises continuously feeding cream to the lower part of a column of cream and displacing cream upwardly in said column, applying to said cream in its upward movement of displacement rotative impulses in opposite directions, thereby whipping the cream, so proportioning the strength of said impulses to the rate of feed as to thoroughly whip the cream without its breaking into butter, displacing whipped cream upwardly out of said whipping zone, and after the whipped cream has emerged from the whipping zone displacing it from the column of cream.

6. The process of whipping cream, which comprises continuously feeding cream to the lower part of a column of cream and displacing cream upwardly in said column, applying to said cream in its upward movement of displacement rotative impulses in opposite directions, thereby whipping the cream, so proportioning the strength of said impulses to the rate of feed as to thoroughly whip the cream without its breaking into butter, displacing whipped cream upwardly out of said whipping zone, and after the whipped cream has emerged from the whipping zone rotating the whipped cream in one direction and displacing it outwardly from said column in a direction substantially tangential to its direction of rotation.

In testimony of which invention, I have hereunto set my hand, at New York, on this 4th day of June, 1923.

CYRUS HOWARD HAPGOOD.

Witnesses:
JOHN G. PAUL,
R. R. WARREN.